US009554566B2

(12) United States Patent
Majszak

(10) Patent No.: US 9,554,566 B2
(45) Date of Patent: Jan. 31, 2017

(54) TROLLING DEVICE FOR CONTROLLING MOVEMENT OF FISHING LINE AND LURE SPEED

(71) Applicant: Thomas E. Majszak, Layton, UT (US)

(72) Inventor: Thomas E. Majszak, Layton, UT (US)

( * ) Notice: Subject to any disclaimer, the term of this patent is extended or adjusted under 35 U.S.C. 154(b) by 143 days.

(21) Appl. No.: 14/320,329

(22) Filed: Jun. 30, 2014

(65) Prior Publication Data
US 2015/0013212 A1    Jan. 15, 2015

Related U.S. Application Data

(60) Provisional application No. 61/845,052, filed on Jul. 11, 2013.

(51) Int. Cl.
*A01K 91/08* (2006.01)
*A01K 95/00* (2006.01)

(52) U.S. Cl.
CPC .............. *A01K 91/08* (2013.01); *A01K 95/00* (2013.01)

(58) Field of Classification Search
CPC ......... A01K 91/08; A01K 93/00; A01K 95/00
USPC .................................. 43/43.13, 44.9, 44.91
See application file for complete search history.

(56) References Cited

U.S. PATENT DOCUMENTS

| 1,320,804 | A | * | 11/1919 | Squarebriggs | ......... | A01K 91/08 43/43.13 |
| 2,119,504 | A | * | 5/1938 | Lawrence | ............... | A01K 85/02 43/43.13 |
| 2,219,886 | A | * | 10/1940 | Blomme | ................. | A01K 91/08 43/43.13 |
| 2,230,751 | A | * | 2/1941 | Johnson | ................. | A01K 95/00 43/43.12 |
| 2,425,069 | A | * | 8/1947 | Metzler | .................. | A01K 95/00 43/43.13 |
| 2,459,287 | A | * | 1/1949 | Robbins | ................. | A01K 95/00 43/43.13 |
| 2,605,577 | A | * | 8/1952 | Waugler | ................. | A01K 85/02 43/43.13 |
| 2,726,475 | A | * | 12/1955 | Wiselka | ................. | A01K 91/08 43/43.13 |
| 2,740,226 | A | * | 4/1956 | Arff | ....................... | A01K 91/06 43/43.13 |
| 2,803,081 | A | * | 8/1957 | Nicholson | .............. | A01K 95/00 43/43.13 |
| 2,814,903 | A | * | 12/1957 | Banowetz | ............. | A01K 93/00 43/43.13 |
| 2,829,464 | A | * | 4/1958 | Pettit, Jr. | ................ | A01K 93/00 43/44.91 |
| 2,843,966 | A | * | 7/1958 | Ingram | .................. | A01K 91/08 43/43.13 |

(Continued)

*Primary Examiner* — Darren W Ark
(74) *Attorney, Agent, or Firm* — Morriss O'Bryant Compagni

(57) ABSTRACT

A trolling device for use in trolling from a moving boat or other water craft is structured to allow the fisher to control the movement of the line and the speed of the lure independently of the movement or speed of the boat or any apparatus used in connection with the boat, such as a downrigger device, the trolling device generally comprising a planar body, a leading end, a trailing end, an upper section and lower section providing for attachment of various devices that enhance the fishing experience, and a channel through which a fishing line or other auxiliary line is positioned to enable the line to be controlled by the user.

17 Claims, 15 Drawing Sheets

(56) References Cited

U.S. PATENT DOCUMENTS

| | | | | |
|---|---|---|---|---|
| 3,090,153 A * | 5/1963 | Clark | A01K 85/10 | 43/43.13 |
| 3,091,050 A * | 5/1963 | Metzler | A01K 95/00 | 43/44.91 |
| 3,096,599 A * | 7/1963 | Baron | A01K 95/00 | 43/44.9 |
| 3,224,132 A * | 12/1965 | Frantz | A01K 97/24 | 43/44.9 |
| 3,241,262 A * | 3/1966 | Beverly | A01K 93/00 | 43/44.91 |
| 3,273,278 A * | 9/1966 | Lynch | A01K 93/00 | 43/44.9 |
| 3,453,768 A * | 7/1969 | Feaster | A01K 85/01 | 43/43.13 |
| 3,470,649 A * | 10/1969 | Cole | A01K 91/08 | 43/43.13 |
| 3,568,355 A * | 3/1971 | Hassell | A01K 95/00 | 43/43.13 |
| 3,738,047 A * | 6/1973 | Tozer | A01K 91/08 | 43/43.13 |
| 3,803,749 A * | 4/1974 | Boyum | A01K 95/00 | 43/44.9 |
| 3,816,954 A * | 6/1974 | Bissonette | A01K 91/08 | 43/43.12 |
| 3,898,758 A * | 8/1975 | Swanningson | A01K 91/06 | 43/43.13 |
| 3,940,871 A * | 3/1976 | Evans | A01K 95/00 | 43/43.13 |
| 3,943,653 A * | 3/1976 | Reckler | A01K 91/08 | 43/43.13 |
| 3,949,512 A | 4/1976 | Stegemeyer | | |
| 4,254,573 A * | 3/1981 | Mastropaolo | A01K 91/08 | 43/43.13 |
| 4,261,130 A | 4/1981 | Cudnohufsky | | |
| 4,458,439 A * | 7/1984 | Garrett, Sr. | A01K 93/02 | 43/44.91 |
| 4,486,970 A | 12/1984 | Larson | | |
| 4,494,334 A * | 1/1985 | Porter | A01K 91/08 | 43/43.12 |
| 4,567,687 A | 2/1986 | Even et al. | | |
| 4,615,135 A * | 10/1986 | Swinbanks | A01K 91/03 | 43/43.13 |
| 4,615,136 A * | 10/1986 | Bank | A01K 95/00 | 43/44.91 |
| 4,635,392 A * | 1/1987 | Wirkus | A01K 93/00 | 43/44.9 |
| 4,656,777 A * | 4/1987 | Fernbach | A01K 93/00 | 43/44.9 |
| 4,672,765 A | 6/1987 | Lutz | | |
| 4,691,468 A * | 9/1987 | Fernbach | A01K 95/02 | 43/44.9 |
| 4,696,125 A * | 9/1987 | Rayburn | A01K 93/00 | 43/44.9 |
| 4,750,288 A * | 6/1988 | Brennan | A01K 91/08 | 43/44.91 |
| 5,185,951 A * | 2/1993 | Hemmerle | A01K 91/08 | 43/43.13 |
| 5,241,774 A * | 9/1993 | Rayburn | A01K 93/00 | 43/44.9 |
| 5,305,543 A * | 4/1994 | Fore | A01K 95/00 | 43/43.13 |
| 5,339,561 A | 8/1994 | Weber | | |
| 5,355,615 A * | 10/1994 | Spickelmire | A01K 91/08 | 43/43.13 |
| 5,377,444 A * | 1/1995 | Gibney, Sr. | A01K 93/00 | 43/44.91 |
| 5,829,184 A * | 11/1998 | Studanski | A01K 85/14 | 43/43.13 |
| 5,918,408 A * | 7/1999 | Laney | A01K 95/005 | 43/43.13 |
| 6,018,903 A * | 2/2000 | Miralles | A01K 91/08 | 43/43.13 |
| 6,286,245 B1 * | 9/2001 | Broberg | A01K 91/08 | 43/27.4 |
| 6,327,808 B1 * | 12/2001 | Zascavage | A01K 85/00 | 43/44.9 |
| 6,412,215 B1 | 7/2002 | Even | | |
| 6,862,838 B1 | 3/2005 | Gibbs | | |
| 6,935,069 B1 * | 8/2005 | Jensen | A01K 91/08 | 43/43.12 |
| 7,178,284 B2 | 2/2007 | Chamberlain | | |
| 7,213,363 B2 * | 5/2007 | Lieb | A01K 93/00 | 43/43.13 |
| 7,578,092 B2 * | 8/2009 | Spickelmire | A01K 91/08 | 43/43.13 |
| 7,654,031 B2 | 2/2010 | Osborn et al. | | |
| 7,694,454 B1 | 4/2010 | Lumsden | | |
| 8,341,871 B2 * | 1/2013 | Kavanaugh | A01K 93/00 | 43/44.9 |
| 8,769,864 B2 * | 7/2014 | Kavanaugh | A01K 93/00 | 43/44.91 |
| 8,950,106 B2 * | 2/2015 | Kaariainen | A01K 85/14 | 43/43.13 |
| 2005/0034355 A1 * | 2/2005 | Dzenis | A01K 91/08 | 43/43.13 |
| 2005/0204609 A1 * | 9/2005 | Greene, II | A01K 91/08 | 43/43.13 |
| 2006/0168875 A1 * | 8/2006 | Brzozowski | A01K 91/06 | 43/44.9 |
| 2006/0254120 A1 * | 11/2006 | Sugiyama | A01K 91/08 | 43/44.91 |
| 2007/0119091 A1 * | 5/2007 | Osborn | A01K 91/08 | 43/43.13 |
| 2008/0022580 A1 * | 1/2008 | Moulder | A01K 91/08 | 43/43.13 |
| 2008/0060253 A1 | 3/2008 | Even | | |
| 2008/0172925 A1 * | 7/2008 | Hazel | A01K 91/08 | 43/43.13 |
| 2008/0256840 A1 * | 10/2008 | Rodriguez | A01K 93/00 | 43/44.91 |
| 2008/0295386 A1 * | 12/2008 | Hudson | A01K 95/02 | 43/44.91 |
| 2010/0058641 A1 * | 3/2010 | Lee | A01K 93/00 | 43/43.13 |
| 2010/0223834 A1 * | 9/2010 | Osborn | A01K 91/08 | 43/43.13 |

* cited by examiner

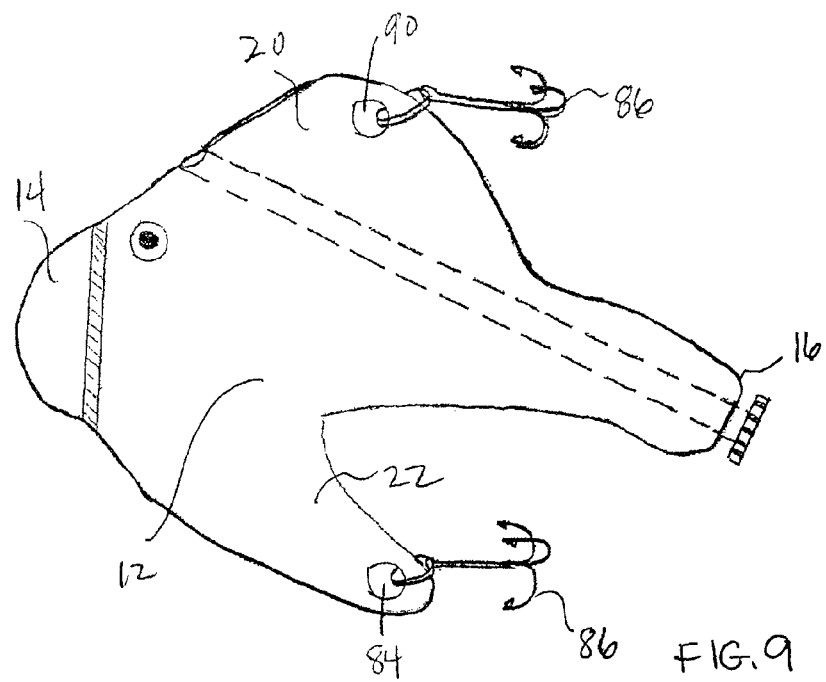
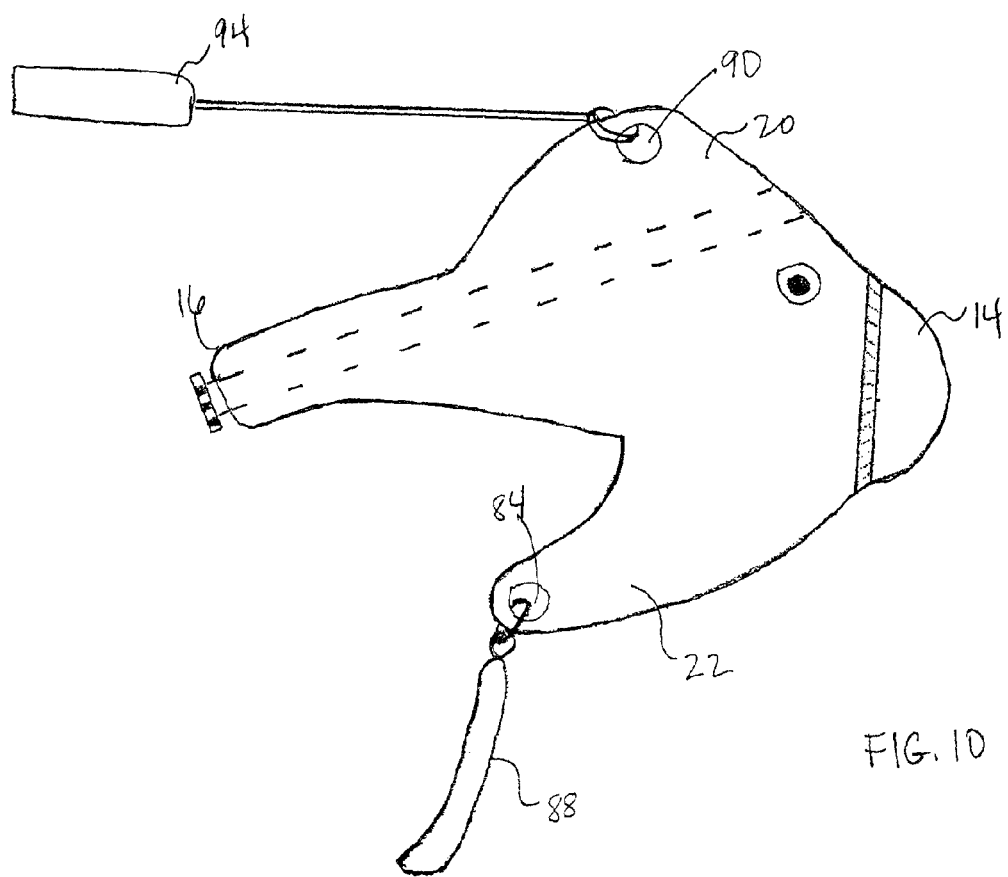

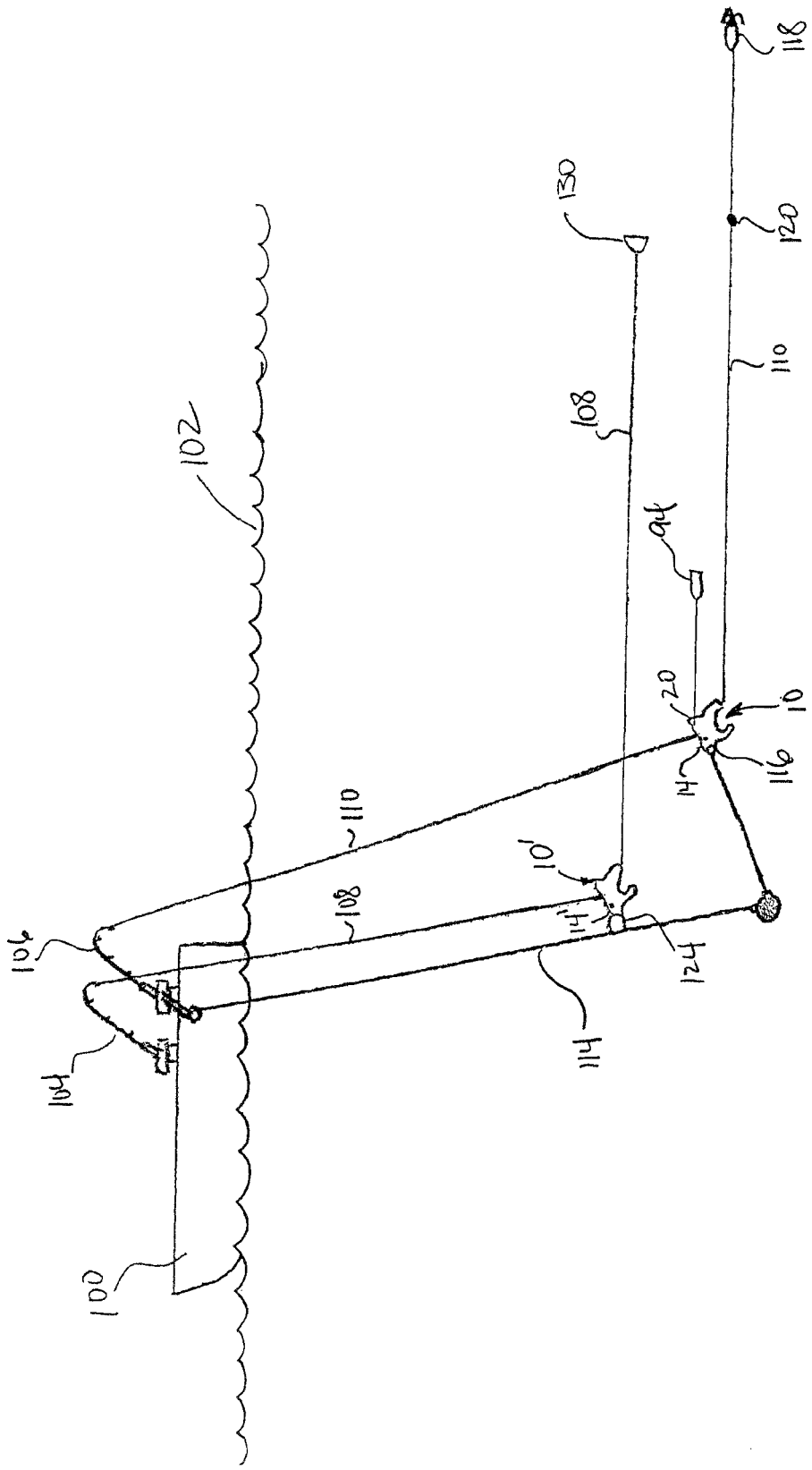

TROLLING DEVICE FOR CONTROLLING MOVEMENT OF FISHING LINE AND LURE SPEED

CROSS REFERENCE TO RELATED APPLICATIONS

This is a non-provisional application that claims priority to provisional application Ser. No. 61/845,052, filed Jul. 11, 2013, the entire contents of which are incorporated herein by reference.

BACKGROUND OF THE INVENTION

Field of the Invention

This invention relates to fishing devices and specifically relates to devices used during trolling to control the movement of the fishing line and to control the lure speed, while also enabling the use of auxiliary devices to enhance the fishing experience.

Background of Related Art

Trolling is a popular form of fishing that is employed in both recreational or sport fishing as well as commercial fishing. Trolling involves drawing one or more baited fishing lines through a body of water by means of a moving water craft. Most typically, the water craft is a conventional boat that is equipped with a trolling motor, though trolling can also be accomplished by manually-propelled craft, such as small boats or canoes that are propelled by oars.

The speed at which the bait or lure on a fishing line is drawn, or trolled, is an important factor in the success of the fishing venture. Thus, trolling motors are capable of being set at variable speeds so that the speed of the water craft can be selected in accordance with the type or species of fish being pursued. Larger fish, such as salmon, move at greater speeds, especially in the ocean, than do lake trout, for example. Other factors also come into consideration in the selection of trolling speeds, including climate conditions and geographical conditions.

Many devices are known, and have been developed, for facilitating trolling, including devices that spread out or separate multiple lines, known as outriggers, so that the lines do not tangle. Other devices, known as downriggers, have been developed to maintain the depth of a line below the bottom of the boat. Many other devices have been developed to manipulate the line and/or bait or lure to simulate conditions that may increase the chance of a attracting fish, such as simulating dying, distressed or fast-moving fish.

Fundamental to all the equipment and devices used in trolling is the fact that the movement of the boat is the determinant factor of the speed at which the fishing line and the lure move in the water. Whether the line is simply cast out from the back of a water craft or is attached to an outrigger and/or downrigger, the speed at which the lure or bait moves through the water to attract fish is controlled by the speed at which the water craft is caused to move, either by a trolling motor or by the speed of rowing. In trolling, the speed at which the lure moves through the water is fixed by the speed of the boat or watercraft, and the only way to vary the speed of the lure is to turn the boat, which causes the outside lure speed to increase and the inside lure speed to decrease.

Thus, it would be advantageous to provide a device by which the fisherman can manipulate and control the movement of the fishing line and the speed of the lure that is separate from the speed of the water craft, and which is independent of the attachment of the fishing line to any other device, such as an outrigger or a downrigger.

BRIEF SUMMARY OF THE INVENTION

In accordance with the present disclosure, a trolling device for controlling the movement of the fishing line and speed of the lure comprises a planar body structured for movement through a body of water, the planar body having a leading end and a trailing end defining a centerline therebetween, an upper portion extending upwardly and away from the centerline of the planar body, a lower portion extending downwardly and away from the centerline of the planar body, and a channel formed through the planar body extending from a point near the leading end to a point near the trailing end of the planar body. The embodiment of the disclosure provides an advantage in the art by enabling the user to control the movement of the fishing line and to control the lure speed independently of the movement of the boat.

In a further embodiment, the upper portion is structured to provide attachment thereto of auxiliary devices that enhance or facilitate the fishing experience.

In yet another embodiment, the lower portion is structured to provide attachment thereto of auxiliary devices for weighting the trolling device in the water or for attaching auxiliary devices that enhance or facilitate the fishing experience.

In certain other embodiments, the leading edge is structured to provide attachment thereto of auxiliary devices for weighting the device in the water or for attaching auxiliary devices that enhance or facilitate the fishing experience.

In still other embodiments, the channel in the trolling device is formed as a bore through the planar body.

In yet other embodiments, the channel is formed at an angle to the centerline.

In further embodiments, the channel is formed as a bore positioned in closer proximity to one side of the planar body to provide an elongated slit through the side of the planar body, the channel further comprising an elongated tube that is sized to be slidably received in the bore and is positioned to rotate in the bore.

In still other embodiments, the elongated tube further comprises an elongated opening that aligns with the elongated slit of the bore to provide for insertion of a fishing line in the elongated tube of the channel.

In other embodiments, the elongated tube further comprises a flange connected to the elongated tube for rotating the elongated tube within the bore of the channel.

In still other embodiments, the planar body is curved from the leading end to the trailing end to facilitate movement of the trolling device through water.

In yet other embodiments, the leading end is configured with shoulders on either side of the centerline which angle inwardly toward the centerline and toward a terminal end of the leading end thereby forming a nose portion, and an anchor point when the device is used as a lure.

In further embodiments, the nose portion provides means for attachment of the trolling device to auxiliary devices, such as a down rigger.

In still other embodiments, the trolling device further comprises a first section, a second section and a third section, the first and second sections being connected together by connector means that enable the first and second sections to articulate relative to each other, and wherein said second section and said third section are connected together by connector means that enable the second section to articulate relative to the third section.

In yet other embodiments, the channel comprises two separate channels, one formed in the second section and one formed in the third section.

In other embodiments, the trolling device further comprises at least one camera attached to the planar body.

In yet other embodiments, a camera is attached to the upper portion of the planar body.

In still other embodiments, a camera is attached to the lower portion of the planar body.

In other embodiments, a line is positioned through the channel, and a camera is attached to an end of the line extending from the channel.

These and other features and advantages of the embodiments of the disclosure will be better understood with consideration of the illustrations and detailed discussion of the examples illustrated.

BRIEF DESCRIPTION OF THE SEVERAL VIEWS OF THE DRAWINGS

In the drawings, which depict what is currently considered to be the best mode of the disclosure:

FIG. 9 is a view in elevation of the device of the disclosure illustrating alternative uses for the device;

FIG. 10 is a side view in elevation of the device illustrating other alternative uses for the device;

FIG. 11 is a depiction of variable uses of the device of the disclosure;

DETAILED DESCRIPTION OF THE INVENTION

Figure 1:
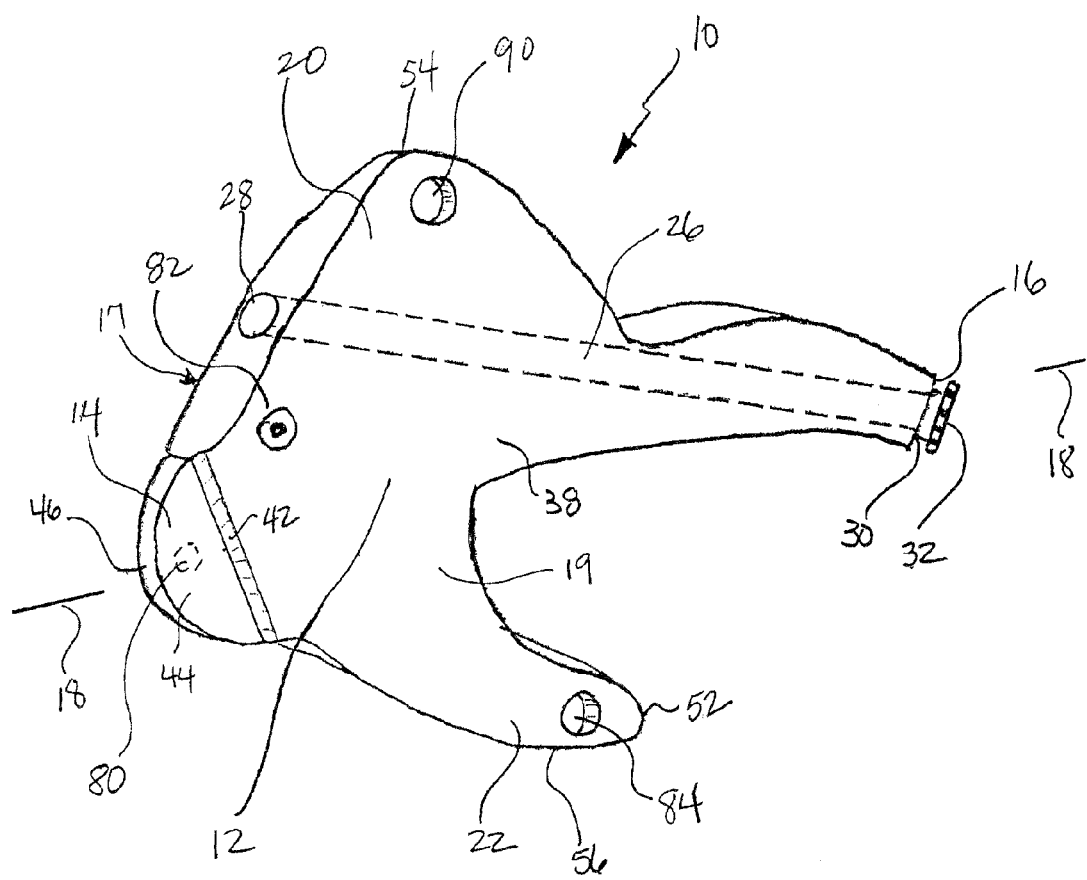
FIG. 1 is a perspective view depicting the general structure of the disclosure.

The general features of the trolling device 10 of the present disclosure are illustrated in FIG. 1 where it can be seen that the device 10 comprises a generally planar body 12 having a leading end 14 and a trailing end 16. By "leading end" is meant that end of the trolling device 10 which, when in use, is positioned away from the lure or bait that is downstream from the boat. By "trailing end" is meant that end of the trolling device 10 which, when in use, is positioned in the same direction as the lure or bait that is downstream from the boat. Stated otherwise, the leading end 14 is upstream from the lure or bait end of the fishing line and the trailing end 16 is positioned downstream from the leading end 14. A centerline 18 of the trolling device 10 is defined between the leading end 14 and the trailing end 16. The centerline 18 may be considered to lie in a vertical plane that bisects the planar body 12, dividing the planar body 12 into two halves, 17, 19 each defining a side of the planar body 12.

The trolling device 10 is further structured with an upper portion 20 that extends from the planar body 12 in a direction upwardly and away from the centerline 18. The upper portion 20 is oriented in a direction that, when in use, extends toward the boat. The trolling device 10 is further structured with a lower portion 22 that extends from the planar body 12 in a direction downwardly and away from the centerline 18. The lower portion 22 is oriented in a direction that, when in use, extends away from the boat. As described further below, the upper portion 20 and lower portion 22 provide means for attachment of various devices that either aid in positioning the trolling device 10 in the water or enhance the fishing experience.

The trolling device 10 further comprises a channel 26 that extends through the planar body 12 and has a first opening 28 located in the direction or area of the leading end 14 and/or upper portion 20, and a second opening 30 that is located near or at the trailing end 16 of the trolling device 10. In some embodiments, the second opening 30 may be fitted with a collar 32, as described more fully below. The channel 26 provides a pathway through which a fishing line (FIG. 6) is drawn, as described more fully below. A leader line for auxiliary devices, as described more fully below, may also be inserted into and through the channel 26.

Figure 2:
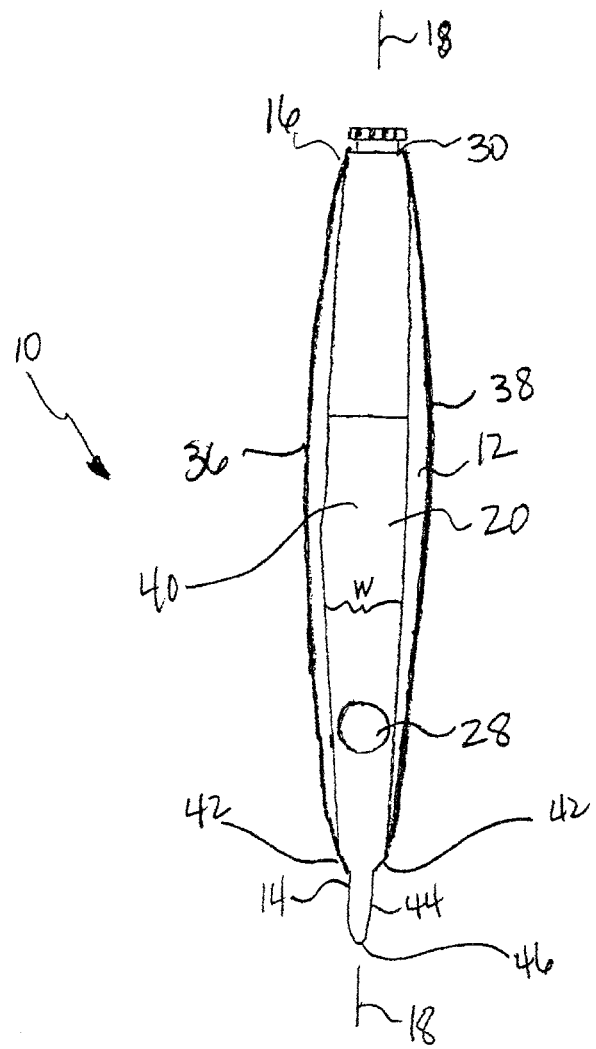
FIG. 2 is a plan view of the top of the structure depicted in FIG. 1.

Having described the general elements of the trolling device 10, more specific detail of the structure of the trolling device 10 can be seen in FIGS. 2-5. In FIG. 2, which illustrates a view of the trolling device 10 looking downwardly upon the upper portion 20, it can be seen that the planar body 12 has a first side 36 and a second side 38 that are curved. The first side 36 and second side 38, near the leading end 14 are in closer proximity to the centerline 18, then flair outwardly from each other near a vertical center 40 of the trolling device 10, then fair toward each other again as the first side 36 and second side 38 approach the trailing end 16 of the device 10. It can be seen that the width W of the upper portion 20 may, in one embodiment, be of lesser dimension than the width of the planar body 12 as measured between the first side 36 and second side 28 near a vertical center 40 of the device 10.

It can also be seen in FIG. 2 that the leading end 14 of the device 10 may be configured with an inwardly extending shoulder 42 on either side of the centerline 18 of the device, the inwardly extending shoulders 42 then fair further inwardly toward the centerline 18 to provide a nose portion 44 of the leading end 14, which terminates in a terminal end 46.

Figure 3:
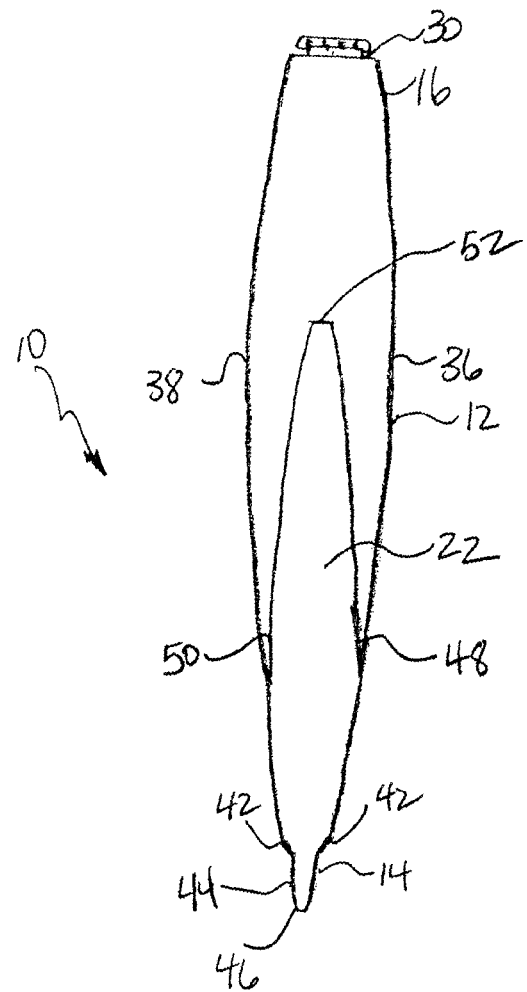
FIG. 3 is a plan view of the bottom of the structure depicted in FIG. 1.

FIG. 3, which depicts a bottom view of the trolling device 10 (i.e., FIG. 2 rotated 180°), illustrates that the lower portion 22 has a first side 48 and a second side 50 which, near the leading end 14, are in closer proximity to each other and then flair outwardly away from each other in a direction away from the centerline 18 just beyond the leading end 14, and then fair inwardly again toward an outer end 52 of the lower portion 22.

Figure 4:
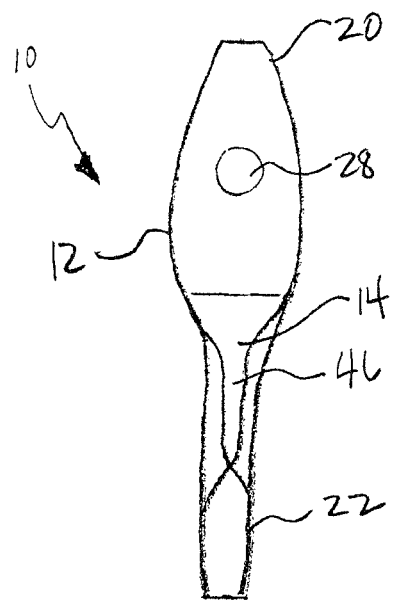
FIG. 4 is a view in elevation of the leading end of the structure depicted in FIG. 1.
Figure 5:
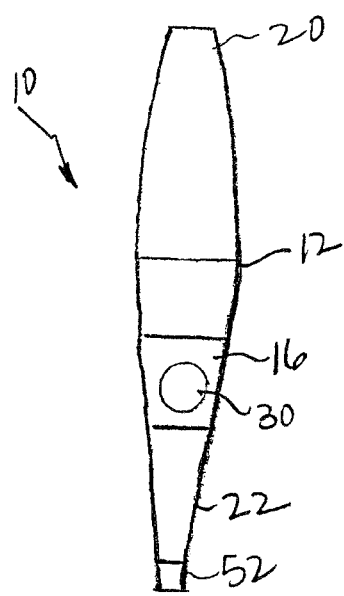
FIG. 5 is a view in elevation of the trailing end of the structure depicted in FIG. 1.

FIG. 4, which depicts a view in elevation of the leading end 14 of the trolling device 10, and FIG. 5, which depicts a view in elevation of the trailing end 16 of the trolling device, further illustrate the curved configuration of the trolling device 10. While the illustrated configuration is but one example of a possible configuration for the trolling device 10, it generally illustrates that the trolling device 10 may be shaped in size, dimension and curvature to facilitate the movement of the trolling device 10 through a body of water.

Figure 6:
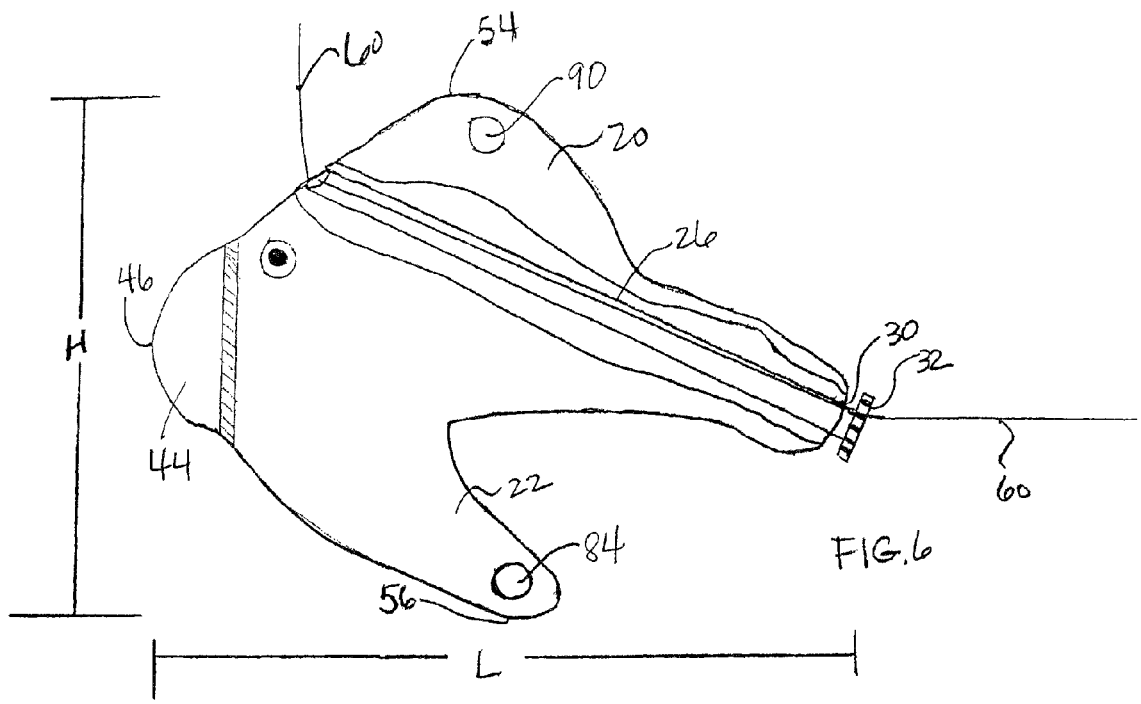
FIG. 6 is a side view in elevation of one embodiment of the disclosure, shown in partial cutaway.

The trolling device 10 may be any suitable size or dimension that enables the trolling device 10 to move through the water and maintain a vertical orientation (i.e., with the upper portion 20 oriented toward the boat, when in use, and the lower portion 22 oriented away from the boat, when in use. By way of example only, the trolling device 10 may have a vertical or height dimension H of between 2¾ inches and 4½ inches, or larger, as measured from a tangential plane formed through the terminal aspect 54 of the upper portion 20 to a tangential plane formed through the lower most aspect 56 of the lower portion 22, as best illustrated in FIG. 6. By way of example only, the trolling device 10 may have a length dimension L of between 3⅞ inches to 5½ inches, as measured from the terminal end 46 of the leading end 14 to the second opening 30 of the channel 26. By way of example only, the width X of the planar body 12, as measured at the widest distance between the first side 36 and second side 38 of the planar body 12, as shown in FIG. 2, may be between 3/16 inch and one inch.

Figure 7:
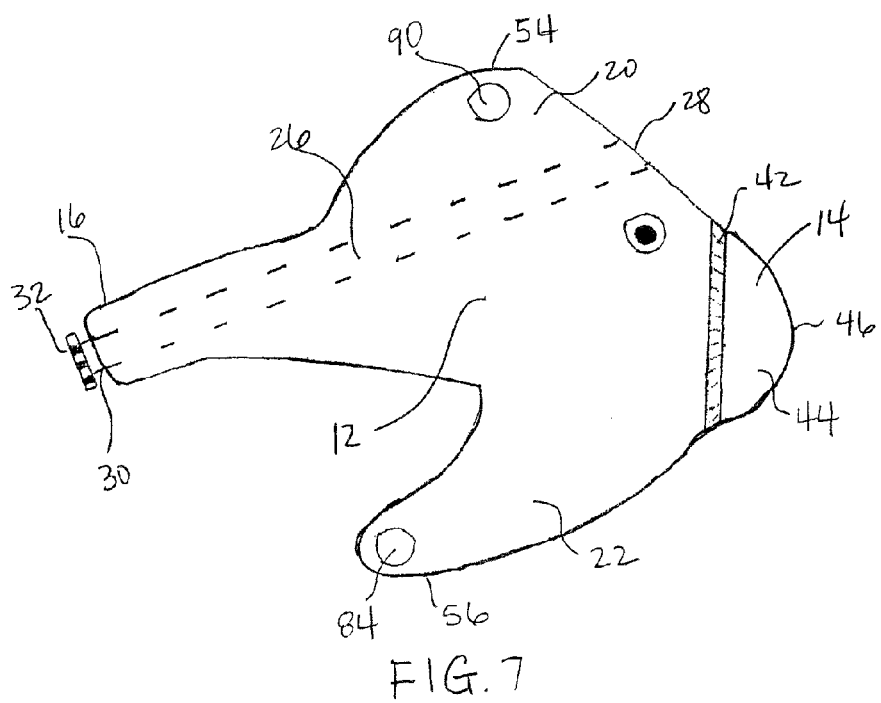
FIG. 7 is a side view in elevation of the other side of the embodiment depicted in FIG. 6.
Figure 8:
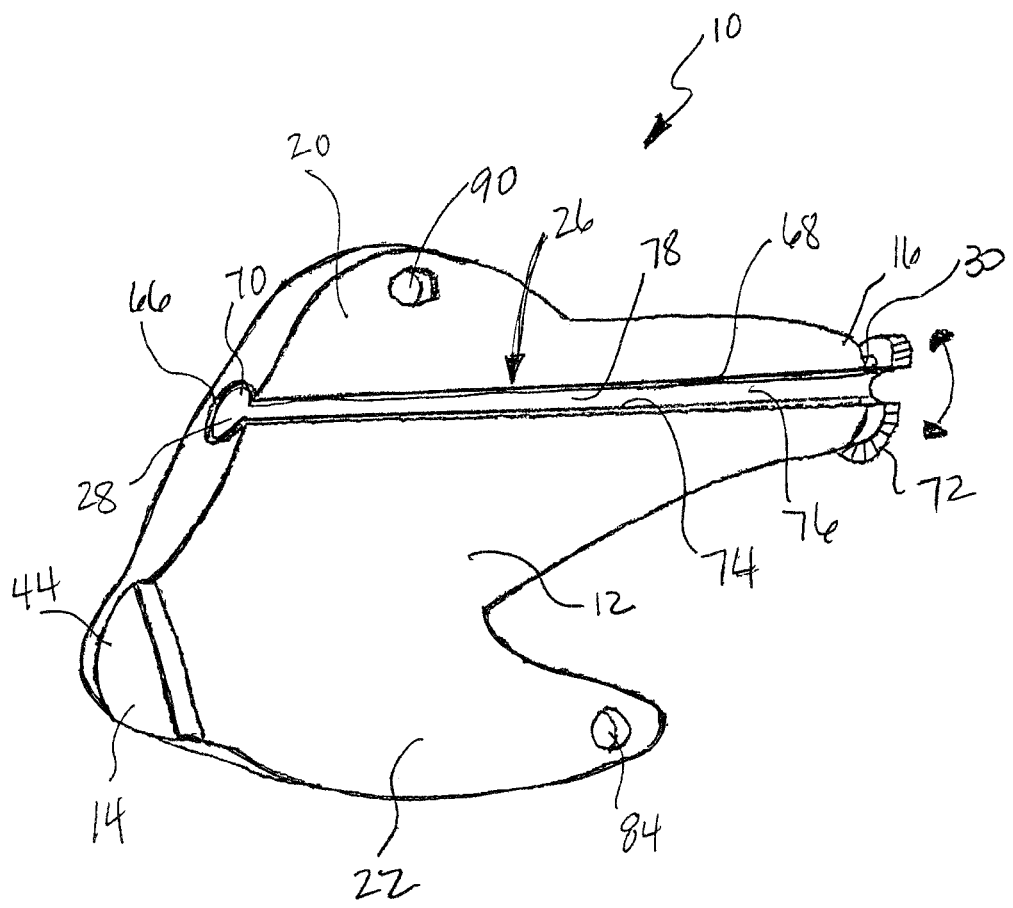
FIG. 8 is a perspective view of a second embodiment of the disclosure.

Reference is made to FIGS. 1, 7 and 8 in which it is illustrated that a channel 26 is formed through the planar body 12 of the device 10 which extends from a first opening 28, that is located proximate to the leading end 14, to a second opening 30 that is located at the trailing end 16 of the device 10. The channel 26 may, in one embodiment, extend through the planar body 12 at an orientation that is parallel to the centerline 18 of the device 10. Alternatively, and in a preferred embodiment, the first opening 28 and second opening 30 may be positioned such that the channel 26 formed therebetween is oriented at an angle to the centerline 18 of the device 10, as depicted in FIGS. 1, 7 and 8.

The channel 26 provides a pathway through which a fishing line 60 may extend, as shown in FIG. 6, although the channel may be used for other purposed as described more fully hereinafter. Thus, the angling of the channel 26 relative to the centerline 18 of the device 10 may provide an advantage is preventing stress on a fishing line 60 as it passes into the first opening 28 of the channel 26, thereby preventing breakage of the fishing line 60. The collar 32 positioned at the second opening 30 may also serve to reduce any stress on the fishing line at is emerges from the second opening, thereby reducing breakage of the line. The channel 26 may be formed through the planar body 12 of the trolling device 10 by any suitable means, including machining a bore to form the channel 26 through the planar body 12, or by molding or casting.

As shown in FIG. 8, the channel 26, in an alternative embodiment, may comprise a bore 66 that is formed through the planar body 12 of the trolling device 10, but is formed in closer proximity to either the first side 36 or second side 38, as shown in FIG. 8, so that an elongated slit 68 is formed in the side of the planar body 12 that extends from the first opening 28 to the second opening 30 of the bore 66. The channel 26 further includes an elongated tube 70 that is sized in circumference to be slidably, yet snugly received within the bore 66 to extend through the length of the bore 66. The elongated tube 70 is received in the bore 66 and retained in a manner that allows the elongated tube 70 to rotate within the long axis of the bore 66 and to be retained in the bore 66. The elongated tube 70 may be formed with a flange 72 which the user may grasp to facilitate rotating the elongated tube 70 within the bore 66.

The elongated tube 70 is further structured with an elongated opening 74 which, when the elongated tube 70 is rotated within the bore 66, aligns with the elongated slit 68 formed through the side 38 of the planar body 12, as depicted in FIG. 8. The aligned slit 68 and opening 74 thereby provide an extended opening 76 along which the fishing line (not shown) can be easily inserted. The user then rotates the flange 72 to cause the elongated tube 70 to rotate within the bore 66 until the elongated opening 72 is no longer in alignment with the elongated slit 68, and the wall 78 of the elongated tube 70 provides a closure of the elongated slit 68.

Referring again to FIGS. 1, 6 and 7, it is noted that the leading end 14 of the trolling device 10 may be structured or configured in any manner that enables the trolling device 10 is be attached to another object. Most particularly, the leading end 14 may be structured in any suitable manner that permits the trolling device 10 to be attached to a downrigger. The nose portion 44 (FIG. 1), for example, may be configured to provide a surface for attaching a clipping device that secures the trolling device 10 to another device, such as a downrigger. In addition, or alternatively, the nose portion 44 may be configured with an aperture 80 (shown in phantom) that provides means for attaching a clip or other device through the aperture 80.

It may also be noted that the trolling device 10 may optionally be configured with a simulated eye 82 to render the device 10 reminiscent of a fish. Such construction may have the additional benefit of endowing the trolling device 10 with the quality of being an attractant or lure to fish.

FIGS. 1, 6, 7, 9 and 10 illustrate that the upper portion 20 and lower portion 22 are structured to enable the attachment of auxiliary devices or objects to the tolling device 10. For example, the lower portion 22 may be structured with an opening 84 that may be used for attachment of a weight or weighting device. While the trolling device 10 may be attached is a downrigger apparatus as the means for positioning the trolling device 10 at a desired depth in the water (e.g., below the boat), the trolling device 10 may also be used alone, without connection to a downrigger, in which case a weighting device may be secured to the lower portion 22 of the trolling device 10 by means of the opening 84. The weighting device will operate to maintain the trolling device 10 at a desired depth while allowing the trolling device 10 to move through the water.

Alternatively, other apparatus or objects may be attached to the lower portion 22 of the trolling device 10, such as hooks 86, as depicted in FIG. 9, or lures 88, as depicted in FIG. 10. Any number of attractant devices, lures or additional fishing lines may be attached to the lower portion 22 via the opening 84. The opening 84 may also be used for attachment of the trolling device 10 to planar devices, which help direct the fishing line in the water, and diver apparatus, commonly known as "dipsey divers" that cause the fishing line to move about in the water to simulate a live fish as the bait.

Similarly, the upper portion has an opening 90 that also enables attachment of various devices or apparatus. As shown in FIG. 9, the opening 90 may be used to attach a hook 86. As depicted in FIG. 10, an attractant 94 in the form of a smell-emitting device may be attached. Any number of other devices may be attached to the trolling device, including hooks, bait, lures, attractants and a camera that would allow the user to view the conditions at or near the bait or lure.

FIG. 11 illustrates two exemplar means for using the trolling device 10 of the present disclosure. A boat 100 is shown floating on a body of water 102 and two rods 104, 106 with fishing lines 108, 110, respectively, are secured in the boat 100. A downrigger device 114 is also shown secured to the boat 100 and positioned in the water 102 below the boat 100.

A first trolling device 10 in accordance with the present disclosure is shown attached to the downrigger device 114 by a connector member 116 secured to the leading end 114 of the trolling device 10. The connector member 116 may be of a fixed nature or may be a quick release connector of known type. The fishing line 110 is drawn through the channel 26 in the trolling device 10 and has a lure or baited hook 118 at the end of the line 110. In accordance with the objective of the disclosure, the fisher is able to control the movement of the line 110 and the speed of the lure 118 by virtue of the fact that the line 110 moves freely through the channel. It may also be noted, however, that an optional bead or split shot 120 may be attached to the line 110 which enables the line 110 to be reeled in without having the trolling device 10 come in contact with a fish attached to the bait 118.

An auxiliary device, in the form of an attractant 94 is attached to the first trolling device 10 at the upper portion 20 thereof. Any other type of auxiliary device may be desirably attached to the first trolling device 10 to enhance the catching of a fish.

A second trolling device 10 is connected to the downrigger 114 by a connector device 124 attached to the leading end 14' of the second trolling device 10'. The connector device 124 preferably fixes the second trolling 10' to the downrigger device 114, but the connector device 124 may also be a quick release device. The fishing line 108 of the rod 104 is positioned through the channel of the second trolling device 10' and an underwater camera 130 is secured to the end of the line 108. In this arrangement, the fisher can record the underwater events as the trolling continues, and can document how the fish was attracted and caught. Because the first trolling device 10 and second trolling device 10' are connected to separate lines 110, 108, the lines can both be manipulated to reel the fish in while also reeling in the camera so that the landing of the fish can be documented or viewed in real time in the boat. Notably, the setup shown in FIG. 11 is but one example of how one or more trolling devices may be used, and numerous other arrangements are possible.

Figure 12:
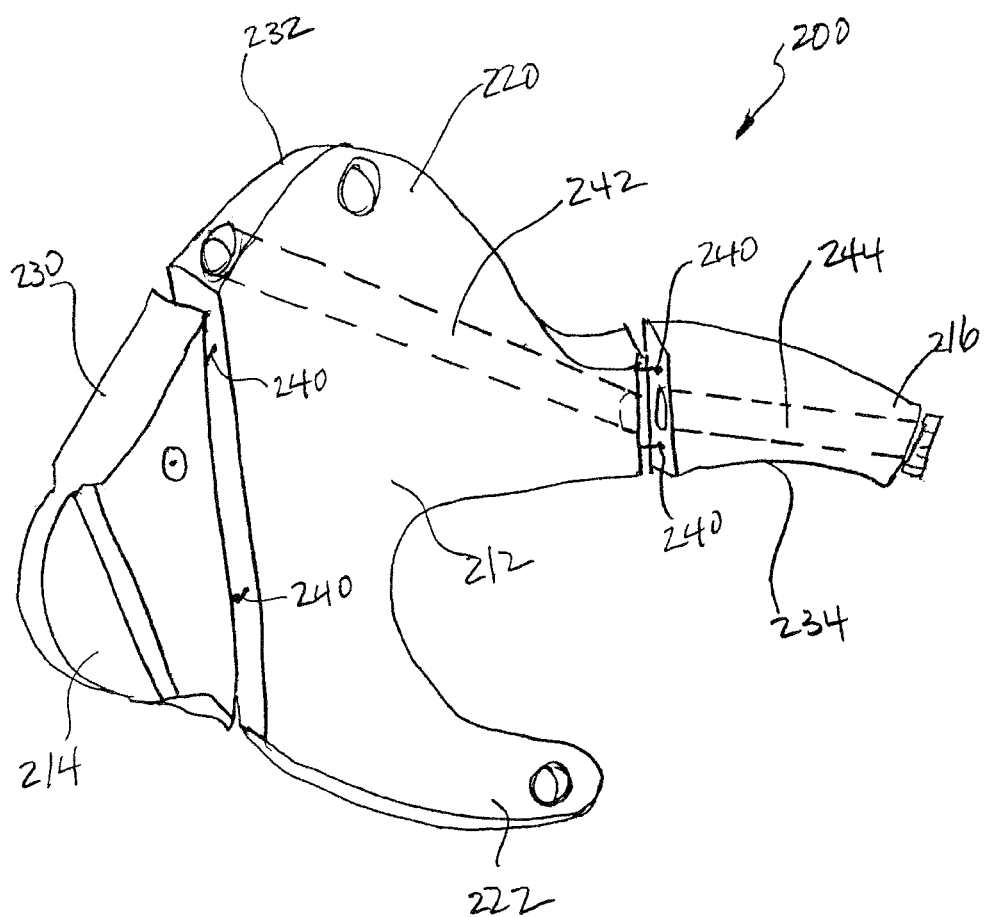
FIG. 12 is a perspective view of another embodiment of the disclosure.
Figure 13:
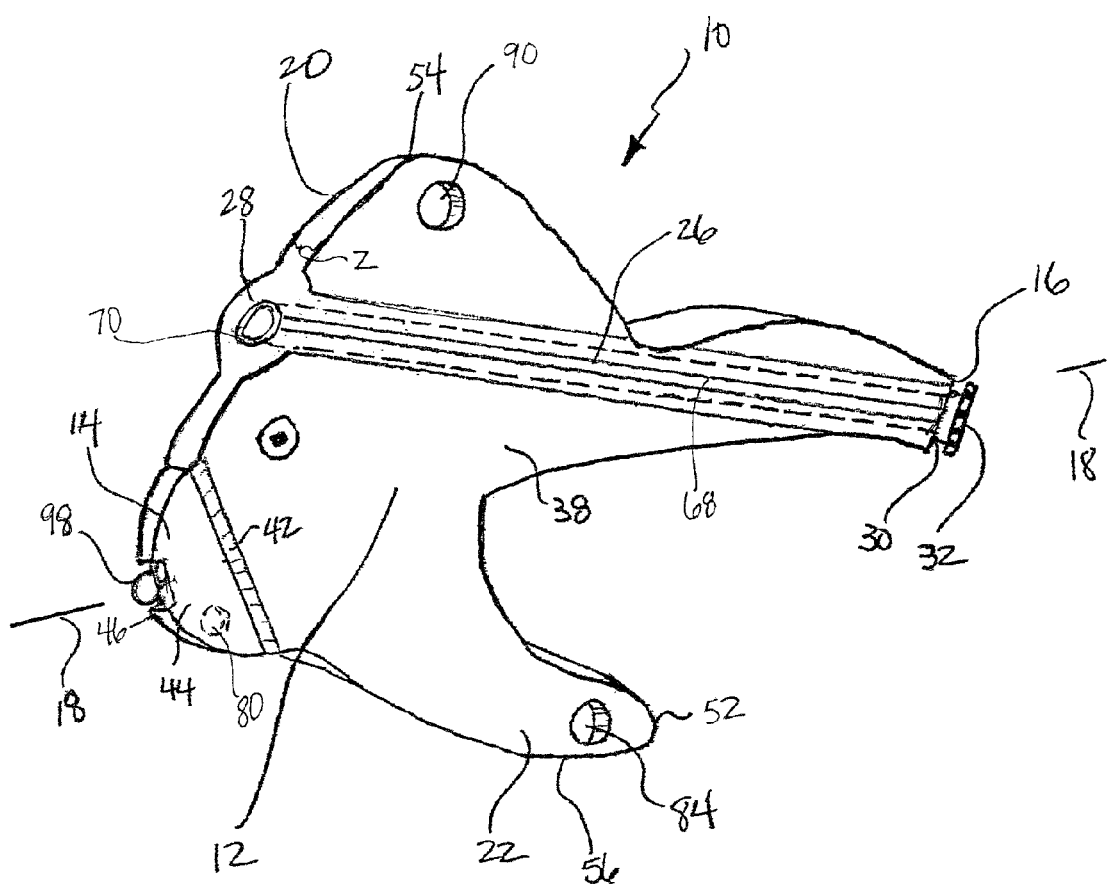
FIG. 13 is a perspective view of still another embodiment of the disclosure.

In another embodiment of the trolling device 10 of the present disclosure, the trolling device 200 may comprise two or more sections that are joined together in a manner that allows each section to be articulated relative to an adjacent section, as illustrated in FIG. 12. The illustrated embodiment of the trolling device 200 comprises a planar body 212, a leading end 214, a trailing end 216, an upper portion 220 and a lower portion 222 as previously described. However, the trolling device 200 is comprised of a first section 230, a second section 232 and a third section 234. The first section 230, generally comprising the leading end 214, is attached to the second section 232 by interlocking devices 240 that allow the first section 230 to move independently of the second section 232. Likewise, the second section 232 is attached to the third section, generally comprising the trailing end 216, with interlocking devices 240 that allow the second section 232 to move independently of the third section.

A first channel 242 may be formed through the second section 232, and a second channel 244 may be formed through the third section 234, the combination of which provide a pathway through which a fishing line may be positioned as previously described. Alternatively, each of the second section 232 and the third second 234 may be fitted with an elongated tube or rotatable channel of the type shown in FIG. 8 and described herein, thereby facilitating the quick and easy positioning of the line through rotatable channels. By virtue of this construction, the articulation of the three sections relative to each other allows the trolling device 200 to simulate the movement of a fish.

Figure 14:
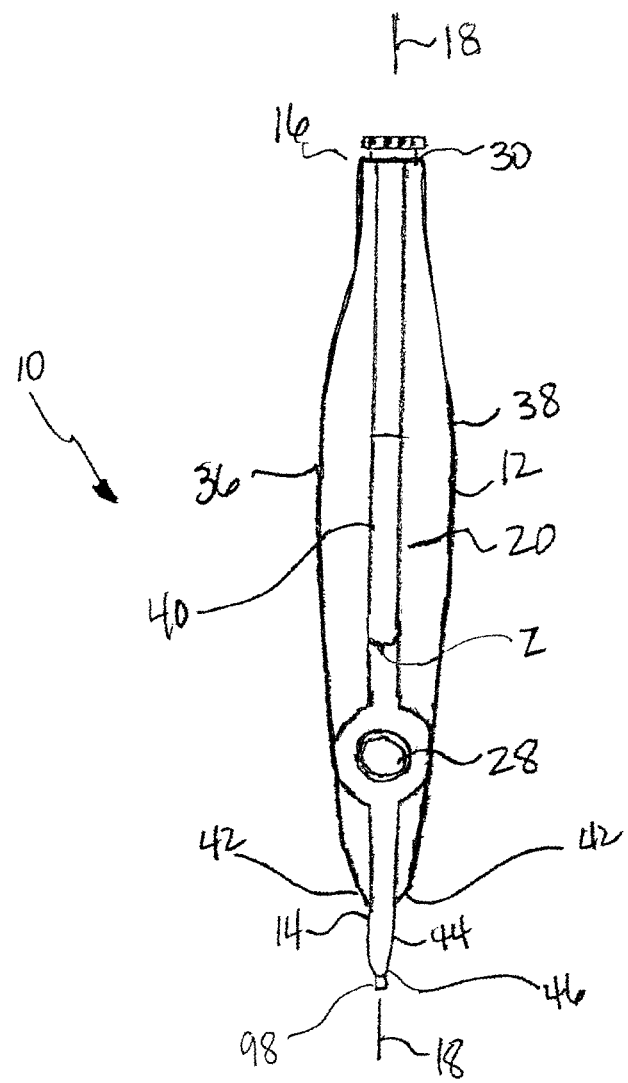
FIG. 14 is a plan view of the top of the device depicted in FIG. 13.

A third embodiment of the disclosure is shown in FIGS. 13-19 which is a modification of the embodiment shown in FIGS. 1-10; thus, like elements are referred to with like reference numerals. In this embodiment, the upper portion 20 is configured with a more streamlined or thinner width dimension Z, which improves the aerodynamics of the trolling device 10 and enables the attachment of various auxiliary devices to the trolling device 10, as described more fully hereinafter. As can best be seen in FIG. 14, the streamlined width of the leading end 14 continues through the upper portion 20 toward the terminal end 46 of the nose portion 44. The width X of the planar body 12 may also be streamlined in a dimension measured from the first side 36 to the second side 38, as illustrated in FIG. 14.

Figure 15:
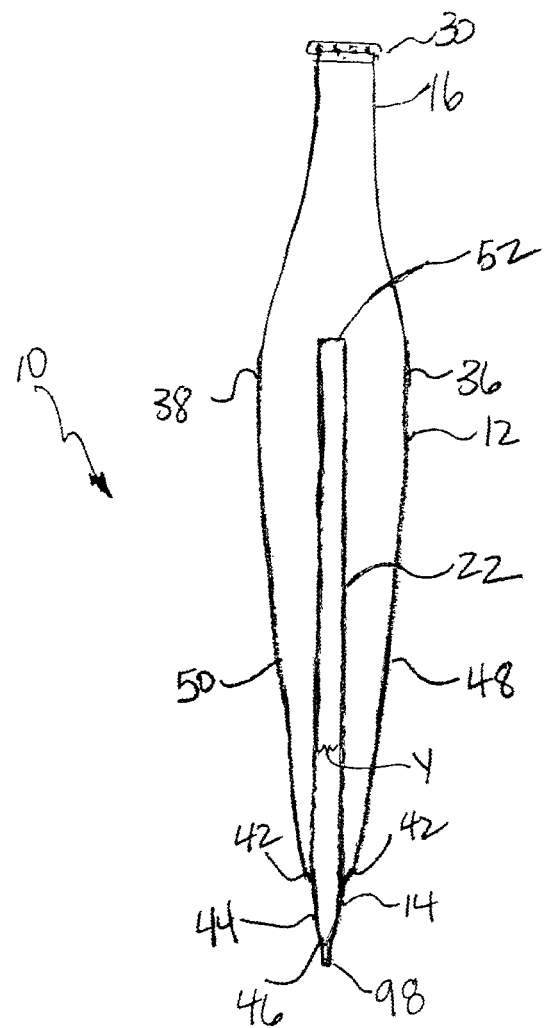
FIG. 15 is a plan view of the bottom of the device depicted in FIG. 13.
Figure 16:
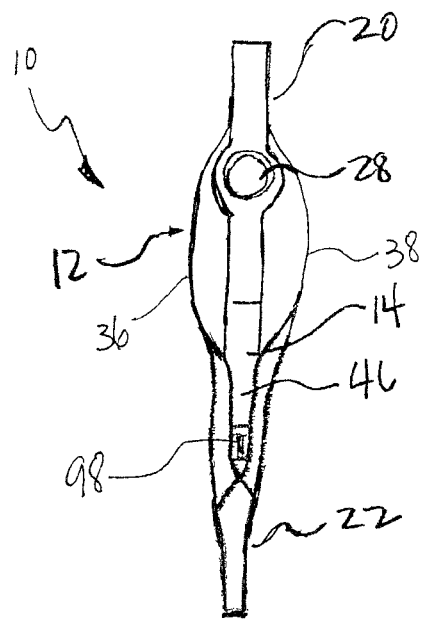
FIG. 16 is a view in elevation of the leading end of the device depicted in FIG. 13.
Figure 17:
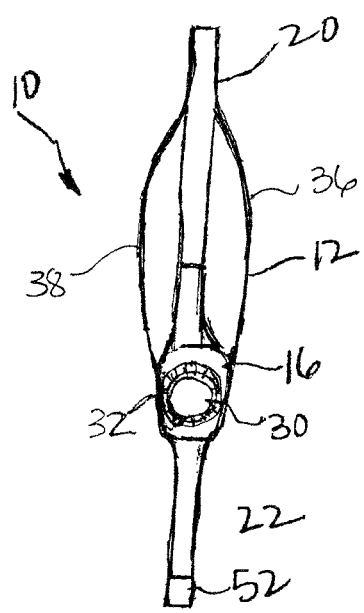
FIG. 17 is a view in elevation of the trailing end of the device depicted in FIG. 13.
Figure 18:
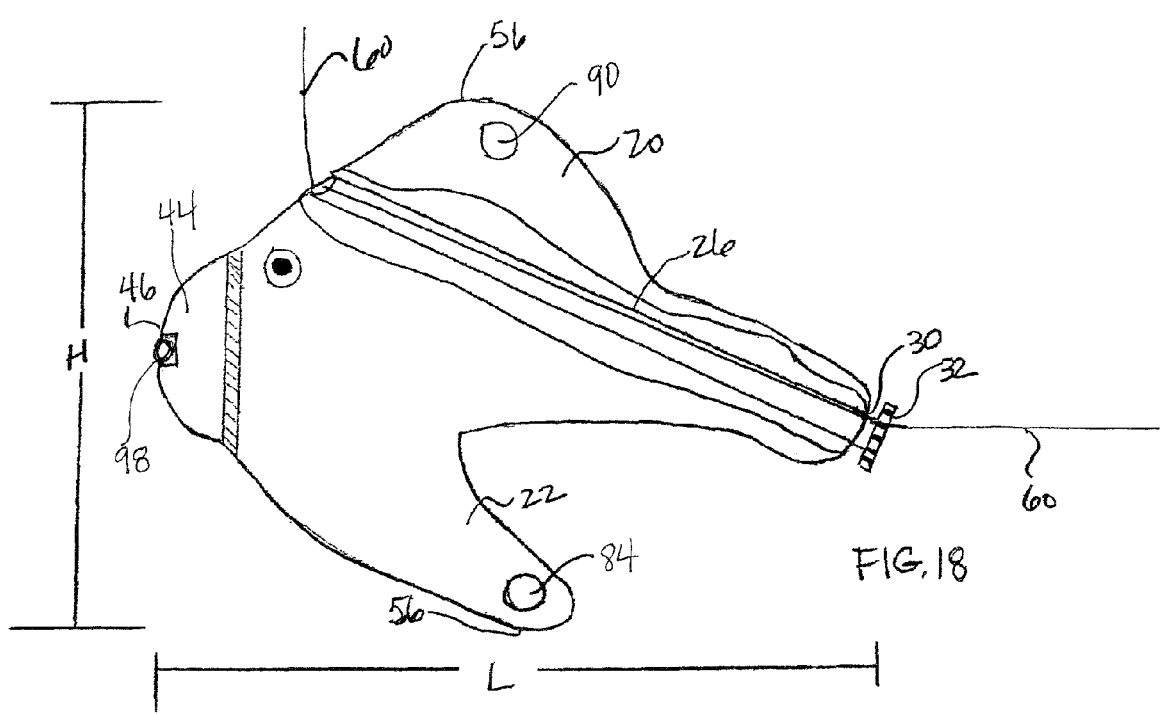
FIG. 18 is a side view in elevation of the embodiment of the device shown in FIG. 13, shown in partial cutaway.

As best seen in FIG. 15, the lower portion 22 is similarly configured with a width dimension Y (FIG. 15) that is streamlined. The smaller dimension Y of the lower portion 22 also improves the aerodynamics of the trolling device 10 and enables the attachment of various auxiliary devices to the lower portion 22 of the trolling device 10, as described more fully hereinafter. The streamlined dimension of the trolling device 10 of this embodiment is further understood from the depictions of FIGS. 16 and 17.

Referring again to FIG. 13, another feature of the trolling device 10 is illustrated in the form of an eyelet hook 98 or similar device that may be attached to the nose portion 44 of the trolling device 10. The terminal end 46 of the nose portion 44 may be configured with a recess 99 into which the eyelet hook 98 is positioned. The eyelet hook 98 may be used for the attachment of such devices as a downrigger or lure. The eyelet hook 98 may also be used for attachment of other auxiliary devices as described herein.

Figure 19:
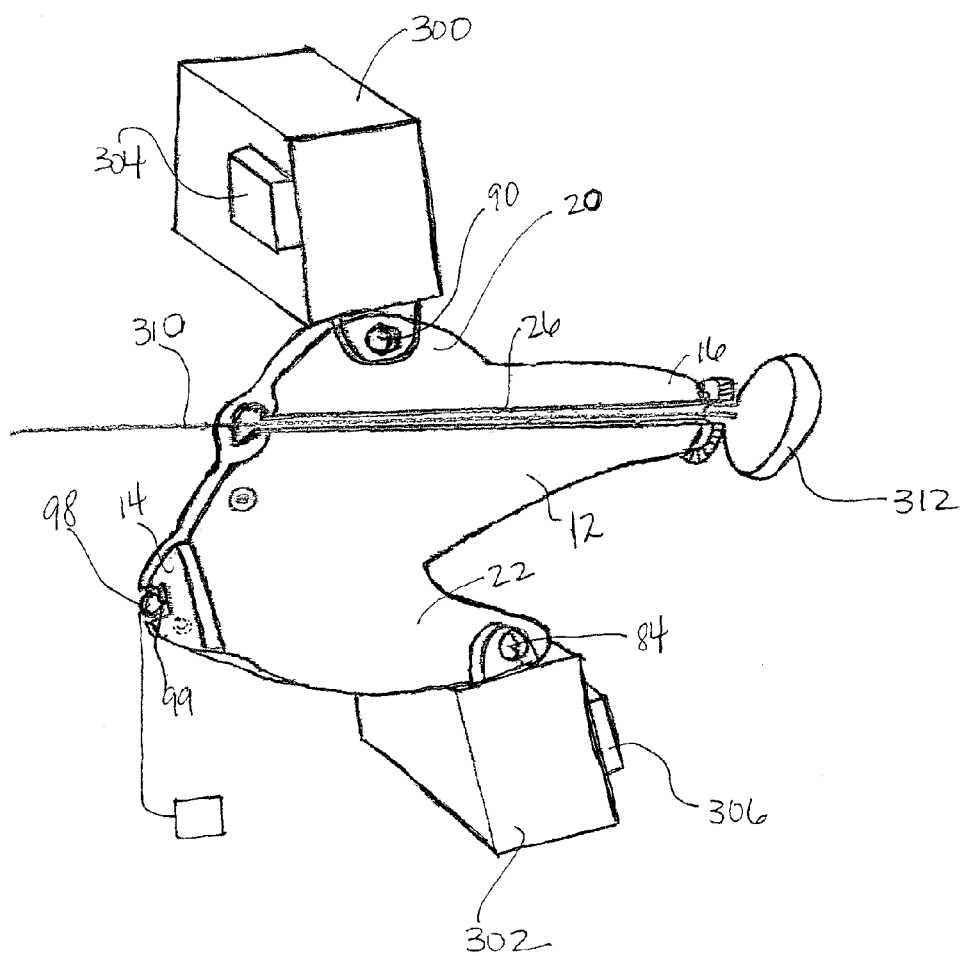
FIG. 19 is a schematic view of one exemplar use of the embodiment of the device illustrated in FIG. 13.

FIG. 19 illustrates a further exemplary use of the trolling device 10 of the disclosure in which the trolling device 10 may be employed for the attachment of at least one camera or a plurality of cameras. For example, a first camera 300 may be attached to the upper portion 20 of the trolling device 10, and a second camera 302 may be attached to the lower portion 22 of the trolling device 10. The first camera 300 may be secured through opening 90 or may be clipped to the upper portion 20. The first camera may be releasably secured to the trolling device 10 or may be permanently attached. Likewise, the second camera 302 may be secured to the lower portion 22 through opening 84 or may be clipped to the lower portion 22. The second camera may be releasably secured to the trolling device 10 or may be permanently attached thereto.

Notably, the first camera 300 may have its lens 304 trained in a direction toward the leading end 14 of the device 10 while the second camera 302 may have its lens 306 trained in a direction toward the trailing end 16 of the trolling device 10, thereby enabling the fisher to observe underwater activities in front of and behind the trolling device 10.

As also shown in FIG. 19, the channel 26 may be used to position therethrough a line 310 that has at its end a third camera device 312 which can be dragged or allowed to trail at a distance away from the trolling device 10. An exemplar type of camera that may be used in this manner is an AquaVu® underwater camera. As also shown in FIG. 19, the eyelet hook 98 may be used to attach auxiliary devices, including but not limited to a fourth camera, a lure or bait or a weighting device. Any number and type of combinations of attachments is possible.

The trolling device of the present disclosure may be made in any number of ways, using any number of materials. For example, the device may be made of injection molded plastic, from wood or from lightweight metal, such as aluminum. Other materials may be equally suitable for use in manufacturing the device.

The trolling device of the present disclosure is directed to providing a means for enabling the user to control the movement of the fishing line and the speed of the lure during trolling. Any number of modifications to the trolling device embodiments described and illustrated herein may be made in carrying out the objectives of the disclosure. Thus, reference to particular details of the trolling device described and illustrated herein are by way of illustrative example and are not meant to limit the scope of the invention as set forth in the claims.

What is claimed is:

1. A trolling device for controlling movement of a fishing line and a speed of a lure, comprising:
 a planar body structured for movement through a body of water, the planar body having:
  a leading end and a trailing end defining a centerline therebetween, wherein the centerline lies in a vertical plane that bisects the planar body and defines a first side and a second side of the planar body;
  an upper portion extending upwardly and away from the centerline of the planar body and having a terminal aspect;
  a lower portion extending downwardly and away from the centerline of the planar body; and
  a channel formed through the planar body extending from a point located between the leading end and the terminal aspect of the upper portion to a point near the trailing end of the planar body, wherein the channel is formed as a bore closer to one of said first side or said second side of the planar body to provide an elongated slit through the one of said first side or said second side of the planar body, the channel further comprising an elongated tube that is sized to be slidably received in the bore and is positioned to rotate in the bore.

2. The trolling device of claim 1 wherein the upper portion is structured to provide attachment thereto of auxiliary devices for catching, attracting or viewing fish while in use.

3. The trolling device of claim 1 wherein the lower portion is structured to provide attachment thereto of auxiliary devices for weighting the trolling device in the water or auxiliary devices for catching, attracting or viewing fish while in use.

4. The trolling device of claim 1 wherein the channel is formed as a bore through the planar body.

5. The trolling device of claim 1 wherein the channel is formed at an angle to the centerline.

6. The trolling device of claim 1 wherein the elongated tube further comprises an elongated opening that aligns with the elongated slit of the bore to provide for insertion of a fishing line in the elongated tube of the channel.

7. The trolling device of claim 6, wherein the channel is formed at an angle to the centerline.

8. The trolling device of claim 1, wherein the elongated tube further comprises a flange connected to the elongated tube for rotating the elongated tube within the bore of the channel.

9. The trolling device of claim 1 wherein the planar body is curved along said first side and said second side from the leading end to the trailing end to facilitate movement of the trolling device through water.

10. The trolling device of claim 1 wherein the leading end is configured with shoulders on either side of the centerline which angle inwardly toward the centerline and toward a terminal end of the leading end thereby forming a nose portion.

11. The trolling device of claim 10 wherein the nose portion provides means for attachment of the trolling device to auxiliary devices, such as a downrigger.

12. The trolling device of claim 11, wherein the means for attachment is an opening formed in the nose portion.

13. The trolling device of claim 11, wherein the means for attachment is an eyelet hook.

14. The trolling device of claim 1, further comprising at least one camera attached to the planar body.

15. The trolling device of claim 14, wherein the at least one camera is attached to the upper portion of the planar body.

16. The trolling device of claim 14, wherein the at least one camera is attached to the lower portion of the planar body.

17. The trolling device of claim 14, wherein a line is positioned through the channel and the at least one camera is attached to an end of the line extending from the channel.

* * * * *